(12) United States Patent
Kurimoto et al.

(10) Patent No.: US 8,828,300 B2
(45) Date of Patent: Sep. 9, 2014

(54) DIE FOR MOLDING CVJ BOOT AND PROCESS FOR MOLDING THE SAME

(75) Inventors: Hidekazu Kurimoto, Kiyosu (JP);
Takuya Ueno, Kiyosu (JP); Akira Maeda, Kiyosu (JP); Junya Miyazawa, Kiyosu (JP); Shinjiro Tomida, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 455 days.

(21) Appl. No.: 13/296,819

(22) Filed: Nov. 15, 2011

(65) Prior Publication Data

US 2012/0153540 A1    Jun. 21, 2012

(30) Foreign Application Priority Data

Dec. 16, 2010 (JP) ................. 2010-280030

(51) Int. Cl.
*B29C 45/36* (2006.01)
*F16D 3/84* (2006.01)
*B29C 45/44* (2006.01)
*B29C 45/33* (2006.01)
*B29L 31/00* (2006.01)

(52) U.S. Cl.
CPC ............. *F16D 3/845* (2013.01); *B29C 45/332* (2013.01); *F16D 2250/00* (2013.01); *B29C 45/33* (2013.01); *B29C 45/4421* (2013.01); *B29L 2031/703* (2013.01)
USPC ........................... 264/334; 249/152; 425/438

(58) Field of Classification Search
CPC ................. B29C 45/4421; B29C 2043/425; B29C 2043/5023; B29C 2045/4421
USPC ............ 249/152, 178, 184; 425/438; 264/334
See application file for complete search history.

(56) References Cited

U.S. PATENT DOCUMENTS

| | | | |
|---|---|---|---|
| 4,771,981 A | 9/1988 | Little et al. | |
| 5,700,415 A * | 12/1997 | Hiroki et al. | 264/318 |
| 2012/0086151 A1 * | 4/2012 | Walker et al. | 264/313 |

FOREIGN PATENT DOCUMENTS

| | | |
|---|---|---|
| JP | 64-025110 U | 2/1989 |
| JP | 05-309661 A | 11/1993 |
| JP | 08-118374 A | 5/1996 |
| JP | 2011-005756 A | 1/2011 |

* cited by examiner

*Primary Examiner* — Yogendra Gupta
*Assistant Examiner* — Kimberly A Stewart
(74) *Attorney, Agent, or Firm* — Posz Law Group, PLC

(57) ABSTRACT

A die for manufacturing CVJ boot by injection molding includes a central core, and a plurality of divisional molds for molding an inner peripheral surface of the CVJ boot, respectively. The divisional molds move diametrically toward the central core. Moreover, the divisional molds not only approach one another diametrically, but also get away from each other axially.

12 Claims, 7 Drawing Sheets

DIE FOR MOLDING CVJ BOOT AND PROCESS FOR MOLDING THE SAME

INCORPORATION BY REFERENCE

The present invention is based on Japanese Patent Application No. 2010-280,030, filed on Dec. 16, 2010, the entire contents of which are incorporated herein by reference.

BACKGROUND OF THE INVENTION

1. Field of the Invention

The present invention relates to a die for molding boot for constant-velocity universal joint (hereinafter being referred to as "CVJ" boot), CVJ boot which has an irregularity making an undercut with respect to the direction of opening the die on the inner peripheral surface. Moreover, it relates to using that die, thereby providing a process for molding CVJ boot.

2. Description of the Related Art

A CVJ boot comprises a minor-diameter cylindrical portion, a major-diameter cylindrical portion, and a bellows portion. The minor-diameter cylindrical portion has a given diameter. The major-diameter cylindrical portion has a diameter that is larger than the diameter of the minor-diameter cylindrical portion, and is disposed to separate away from the minor-diameter cylindrical portion as well as to be coaxial with the minor-diameter cylindrical portion. The bellows portion has a configuration of circular truncated cone substantially, and connects the minor-diameter cylindrical portion with the major-diameter cylindrical portion integrally. Accordingly, when molding the CVJ boot by injection molding, it might be difficult to remove or release a molded article from a die because the resulting bellows portion makes an undercut with respect to the molding face of a core mold for molding the inner peripheral configuration of the bellows portion. Consequently, it has been heretofore common conventionally to mold at least the bellows portion by blow molding. Note that injection blow molding has also been used not only to mold the bellows portion by blow molding but also to mold the major-diameter cylindrical portion and/or the minor-diameter cylindrical portion by injection molding.

However, it might be difficult to mold the inner peripheral surface of the bellows portion with higher accuracy, as well as to control the wall thickness of the bellows portion highly accurately, by blow molding. Accordingly, it has been necessary to examine complicated production technologies, such as stabilizing the wall thickness by controlling the height between the crests and roots in the bellows portion. Moreover, the injection blow molding might have been associated with such problems that not only the facilities might have become large-sized but also the molding cycle might have become prolonged, because it has been needed to carry out two steps, the injection molding step and the blow molding step. Consequently, it has been longed for making it possible to mold the bellows portion as well by injection molding.

Yet, the injection molding might possibly have led to the problem with how to remove or release the bellows portion from the core mold, as described above. Hence, it is possible to think of using such a foldable core for molding as disclosed in Japanese Unexamined Patent Publication (KOKAI) Gazette No. 62-56,113, for instance. The foldable core is used for molding a can that is provided with an inwardly-directed lip, for instance. The foldable core comprises a tapered central member, an inner segment, and an outer segment. Moreover, the tapered central member, which moves axially, makes each of the inner segment and outer segment move diametrically. In addition, the outer segment is provided with a groove for molding the inwardly-directed lip. Thus, the groove moves diametrically along with the outer segment in a direction of getting away from the inwardly-directed lip to be molded, thereby inhibiting the resulting inwardly-directed lip from making an undercut.

Japanese Unexamined Patent Publication (KOKAI) Gazette No. 62-56,113 also discloses a core for molding. In the core being disclosed, three inner segments, and three outer segments are laid out symmetrically around a tapered central member. However, the thus constructed core has such a problem that the inner segments and outer segments are limited in terms of the magnitude in the diametrical movement, respectively, because the inner segments have interfered with each other promptly, or because the outer segments have interfered with each other promptly, after the tapered central member starts retracting. That is, the disclosed core only makes it possible to mold lips having restricted heights alone that do not turn into undercuts, but has not enabled manufacturers to mold a molded article having a constituent part that makes a greater undercut, such as the bellows portion of CVJ boot in which the heights between the crests and roots are larger.

SUMMARY OF THE INVENTION

The present invention has been developed in view of the aforementioned circumstances. It is therefore an object of the present invention to make it possible to mold CVJ boots by injection molding, CVJ boots which have an irregularity that could possibly make a greater undercut on the inner peripheral surface.

The present invention, which solves the above-described problems, is directed to a die for molding, the die being used in order to manufacture CVJ boot by injection molding, the CVJ boot comprising: a minor-diameter cylindrical portion having a given diameter; a major-diameter cylindrical portion having a diameter that is larger than the diameter of the minor-diameter cylindrical portion, and being disposed to separate away from the minor-diameter cylindrical portion as well as to be coaxially with the minor-diameter cylindrical portion; and a bellows portion having a configuration of circular truncated cone substantially, and connecting the minor-diameter cylindrical portion with the major-diameter cylindrical portion integrally, and the die comprising:

an outer mold having a mold face for molding an outer peripheral surface of the CVJ boot; and a core mold having a mold face for molding an inner peripheral surface of the CVJ boot;

the core mold comprising:

a central core having a configuration whose diameter tapers from wide to narrow in the direction away from a trailing end to a leading end; and a plurality of divisional molds being disposed radially about the central core, and having a mold face for molding an inner peripheral surface of the CVJ boot on an outer peripheral surface thereof, respectively;

the divisional molds comprising:

a pair of first divisional molds being disposed to face one another about the central core;

a pair of second divisional molds being disposed to face one another about the central core in an orthogonal direction with respect a disposition direction of the paired first divisional molds; and a plurality of third divisional molds being disposed between one of the paired first divisional molds and one of the paired second divisional molds, respectively; and the die further comprising:

a first driver for retracting the central core in order to move the paired first divisional molds diametrically toward a center of the die in such a direction that the paired first divisional molds approach one another, thereby releasing a molded body from the paired first divisional molds;

a second driver for not only moving the paired first divisional molds axially in such a direction that the paired first divisional molds get away from the paired second divisional molds but also moving the paired second divisional molds diametrically toward the center of the die in such a direction that the paired second divisional molds approach one another, after actuating the first driver, thereby releasing the molded body from the paired second divisional molds; and a third driver for not only moving the paired second divisional molds axially in such a direction that the paired second divisional molds get away from the third divisional molds but also moving the third divisional molds diametrically toward the center of the die in such a direction that the third divisional molds approach one another, after actuating the second driver, thereby releasing the molded body from the third divisional molds.

Moreover, the present invention is also directed to a process for molding CVJ boot, the CVJ boot comprising:

a minor-diameter cylindrical portion having a given diameter;

a major-diameter cylindrical portion having a diameter that is larger than the diameter of the minor-diameter cylindrical portion, and being disposed to separate away from the minor-diameter cylindrical portion as well as to be coaxially with the minor-diameter cylindrical portion; and a bellows portion having a configuration of circular truncated cone substantially, and connecting the minor-diameter cylindrical portion with the major-diameter cylindrical portion integrally;

when manufacturing the CVJ boot by injection molding, the process using a die for molding, the die comprising:

an outer mold having a mold face for molding an outer peripheral surface of the CVJ boot; and a core mold having a mold face for molding an inner peripheral surface of the CVJ boot;

the core mold comprising:

a central core having a configuration whose diameter tapers from wide to narrow in the direction away from a trailing end to a leading end; and a plurality of divisional molds being disposed radially about the central core, and having a mold face for molding an inner peripheral surface of the CVJ boot on an outer peripheral surface thereof, respectively;

the divisional molds comprising:

a pair of first divisional molds being disposed to face one another about the central core;

a pair of second divisional molds being disposed to face one another about the central core in an orthogonal direction with respect a disposition direction of the paired first divisional molds; and a plurality of third divisional molds being disposed between one of the paired first divisional molds and one of the paired second divisional molds, respectively; and the process comprising the steps of:

molding a molded body by injecting a molding material into a cavity being formed between the core mold and the outer mold;

releasing the molded body firstly from the paired first divisional molds by not only retracting the central core but also moving the paired first divisional molds diametrically toward a center of the die in such a direction that the paired first divisional molds approach one another;

releasing the molded body secondly from the paired second divisional molds by not only moving the paired first divisional molds axially in such a direction that the paired first divisional molds get away from the paired second divisional molds but also moving the paired second divisional molds diametrically toward the center of the die in such a direction that the paired second divisional molds approach one another;

releasing the molded body thirdly from the third divisional molds by not only moving the paired second divisional molds axially in such a direction that the paired second divisional molds get away from the third divisional molds but also moving the third divisional molds diametrically toward the center of the die in such a direction that the third divisional molds approach one another; and releasing the molded body fourthly from the outer mold.

The die for molding according to the present invention comprises and outer mold and core mold, or the process for molding according to the present invention uses a die comprising an outer mold and a core mold. The core mold includes a central core, a pair of first divisional molds, a pair of second divisional molds, and a plurality of third divisional molds. The paired second divisional molds are disposed to face one another about the central core in an orthogonal direction with respect to a disposition direction of the paired first divisional molds. Moreover, the paired second divisional molds move diametrically in such a direction that they approach one another after they have moved axially in such a direction that they get away from the paired first divisional molds, or at the same time as they move in the axial direction. As a result, it is possible not only to inhibit the paired second divisional molds from interfering with the paired first divisional molds, but also to move the paired second divisional molds in a greater magnitude securely or reliably. In addition, the third divisional molds move diametrically in such a direction that they approach one another after they have moved axially in such a direction that they get away from the paired second divisional molds, or at the same time as they move in the axial direction. Likewise, as a result, it is possible not only to inhibit the third divisional molds from interfering with the paired second divisional molds, but also to move the third divisional molds in a greater magnitude securely or reliably. Accordingly, it is possible to remove or release the resultant molded body, namely, a CVJ boot, from the core mold with ease. Consequently, it is possible to mold CVJ boots readily by injection molding.

Moreover, the present invention enables manufacturers to mold CVJ boots by carrying out injection molding alone. That is, since the present invention makes it possible to form the bellows portion highly accurately in the wall thickness, the resulting CVJ boot is stabilized in the qualities. In addition, the present invention enables the movable molds, the paired first divisional molds, paired second divisional molds and third divisional molds, to move only by a diminished stroke, respectively. In other words, since the present invention makes it possible to provide a die with a thinner die thickness as a whole, the die for molding CVJ boot according to the present invention can be manufactured less expensively. Furthermore, since the present invention enables manufactures to shorten the molding cycle of CVJ boot, the manufacturers can produce CVJ boots with upgraded productivity.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
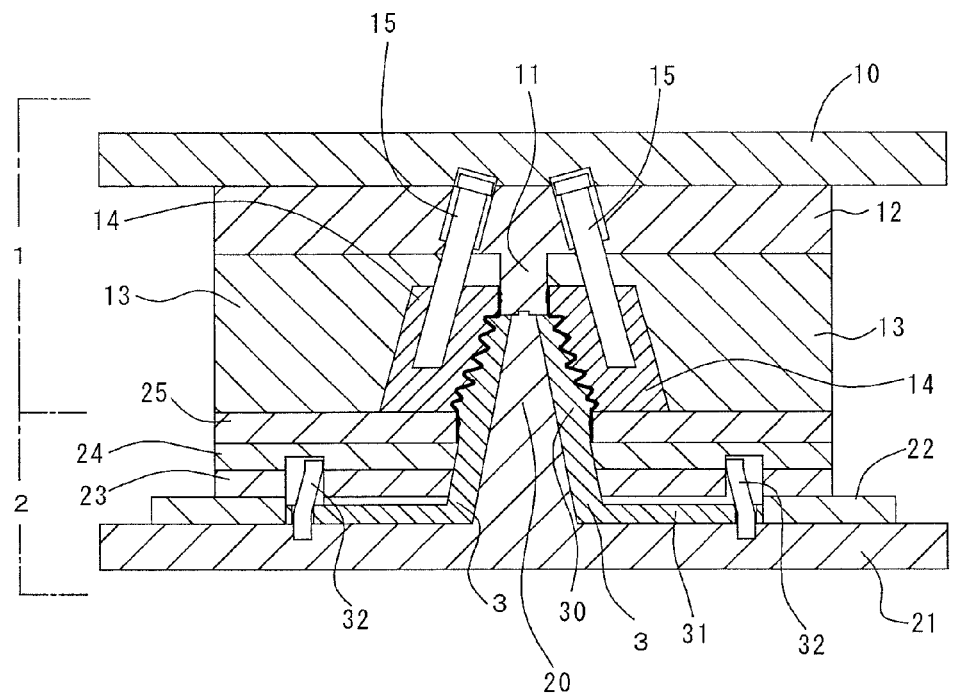
FIG. 1 is a cross-sectional diagram that is taken along the imaginary chain line "1"-"1" in FIG. 2 in order to illustrate one of embodiments of the present invention that is directed to a die for molding CVJ boot, wherein the present die according to the embodiment is placed under the condition of molding a CVJ boot.

Having generally described the present invention, a further understanding can be obtained by reference to the specific preferred embodiments which are provided herein for the purpose of illustration only and not intended to limit the scope of the appended claims.

Embodiments

A die and process for molding according to the present invention are utilized for manufacturing CVJ boots by injection molding. A CVJ boot comprises a minor-diameter cylindrical portion, a major-diameter cylindrical portion, and a bellows portion. The minor-diameter cylindrical portion has a given diameter. The major-diameter cylindrical portion has a diameter being larger than the diameter of the minor-diameter cylindrical portion, and is disposed to separate away from the minor-diameter cylindrical portion as well as to be coaxially with the minor-diameter cylindrical portion. The bellows portion has a configuration of circular truncated cone substantially, and connects the minor-diameter cylindrical portion with the major-diameter cylindrical portion integrally. The present die for molding and process for molding enable manufacturers to manufacture CVJ boots, which include bellows portions in which the height of the crests and the depth of the roots differ greatly, by injection molding.

The die for molding according to the present invention comprises an outer mold, and a core mold. The outer mold has a mold face for forming a CVJ boot's outer peripheral surface. The core mold has a mold face for forming the CVJ boot's inner peripheral surface. Note that, when molding CVJ boots including bellows portions in which the height of the crests and the depth of the roots differ less, it is even feasible to forcibly remove or release the resultant molded bodies from the outer mold by elastically deforming the molded bodies. In general, however, the outer mold includes a plurality of divisional outer molds that are divided by at least one imaginary flat face involving a molded body's central axis.

For example, the core mold includes a central core, and a plurality of divisional cores. The central core has a configuration whose diameter tapers from wide to narrow in the direction away from the trailing end to the leading end. The divisional cores are disposed radially about the central core, and has a mold face for molding the CVJ boot's inner peripheral surface on the outer peripheral surface, respectively. Although the central core can be formed as a circular-coned shape or a pyramidal shape, it is preferable that the central core can be formed as a configuration of truncated pyramid with polygonal cross section. Forming the central core as a truncated pyramid with polygonal cross section enables the resulting central core to come in contact with the divisional cores via the contact between the former's flat faces and the latter's flat faces. That is, it is possible to inhibit the central core from interfering with the divisional cores, or vice versa. Accordingly, it is possible for the divisional cores to move diametrically over a greater distance. Consequently, it is possible to remove or release the resultant CVJ boot from the divisional cores even when the CVJ boot includes the bellows portion whose crests and roots exhibit greater differences between the heights and the depths.

Hereinafter, a direction of the central core's imaginary central axis will be referred to as "axial direction," or "axially." Moreover, a direction that crosses the axial direction orthogonally will be referred to as "diametric direction," or "diametrically." In addition, a circular boundary of imaginary circles that center about the axial direction will be referred as "circumferential direction," or "circumferentially."

The divisional cores, which are disposed radially about the central core of the core mold, are provided with a pair of first divisional molds, a pair of second divisional molds, and a plurality of third divisional molds, at least. The paired first divisional molds are disposed to face one another about the central core. The paired second divisional cores are disposed to face one another about the central core in an orthogonal direction with respect to the paired first divisional molds' disposition direction. The third divisional molds are disposed between one of the paired first divisional molds and one of the paired second divisional molds, respectively.

The paired first divisional molds are disposed to face one another about the central core, but are made slidable relatively to the central core, or vice versa, by a first driver. For example, as the first driver, the central core's outer surface, and the paired first divisional molds' inner surface can be provided with a dented groove and a protuberant streak that extend linearly from the leading end toward the trailing end, respectively. The engagement between the dented groove and the protuberant streak enables the first divisional molds to slide relatively to the central core, or vice versa. Moreover, when the first driver actuates the central core to retract axially with respect to the paired first divisional molds, the engagement between the dented groove and the protuberant streak moves the paired first divisional molds diametrically in such a direction that they approach one another, because the central core is formed as a tapered configuration whose diameter becomes smaller as it comes to the leading end but becomes larger as it comes to the trailing end.

Alternatively, the first driver can be actuated by the engagement between a sliding core and an inclined pin or inclined cam. Moreover, adjusting the tapering angle or diameter of the central core appropriately, or adjusting the inclination angle of the inclined pin or inclined cam appropriately, leads to readily moving each of the paired first divisional molds diametrically over a longer distance that is greater than are the differences between the crests' heights and the roots' depths in the bellows portion. As a result, it is possible to remove or release the inner peripheral surface of the resulting bellows portion from the molding faces of the paired first divisional molds. Note, however, that the resultant molded body has not yet been removed or released from the paired second divisional molds, and from the third divisional molds, under the condition that the molded body is removed or released firstly from the paired first divisional molds.

The paired second divisional molds are disposed to face one another about the central core in an orthogonal direction with respect to the paired first divisional molds' disposition direction. The paired second divisional molds that are thus laid out orthogonally result in making it possible to move each of the paired first divisional molds, and each of the paired second divisional molds, over a longer distance inwardly or contractively in such a direction that they approach one another. To put it differently, not only it is possible to downsize the die for molding according to the present invention in the overall configuration, but also it is much easier to remove or release the resultant molded body from the paired first and second divisional molds.

Moreover, the third divisional molds are disposed between one of the paired first divisional molds and one of the paired second divisional molds, respectively. Note that the first, second and third divisional molds come in contact with the central core's faces, respectively, to make the core mold, at the time of injection molding. It is necessary to provide the third divisional molds in a quantity of four at least. However, it is possible to further divide at least two of the third divisional molds in the circumferential direction in order to make a plurality of extra fourth divisional molds in a quantity of four at least. If such is the case, the die for molding according to the present invention can further comprise a fourth driver for actuating the fourth divisional molds.

In addition, the die for molding according to the present invention further comprises a second driver. After the first driver has been actuated, the second driver not only moves the paired first divisional molds axially in such a direction that the paired first divisional molds get away from the paired second divisional molds, but also moves the paired second divisional molds diametrically toward the present die's center in such a direction that the paired second divisional molds approach one another, thereby removing or releasing the resultant molded body from the paired second divisional molds. The second driver actuates the paired second divisional molds to move diametrically toward the present die's center in such a direction that they approach one another. Since the first driver has actuated the central core to retract and the paired first divisional molds as well to retract from the paired second divisional molds, a wider space is formed in such a direction that the paired second divisional molds try to move. As a result, the paired second divisional molds can move into the resulting wider space without ever interfering with the central core and paired first divisional molds. Accordingly, it is possible to provide a longer distance for the paired second divisional molds to move in such a direction that they approach one another. Consequently, even when the bellows portion has the crests and roots that exhibit greater differences between the heights and the depths, it is easy to remove or release such a bellows portion from the paired second divisional molds.

Moreover, since the paired second divisional molds' disposition direction crosses with the paired first divisional molds' disposition direction orthogonally, it is possible to make the limitation minimum in terms of the paired second divisional molds' moving direction. That is, it is becomes easier to design the paired second divisional molds in terms of the moving direction. In addition, it is desirable that the paired second divisional molds can be made so as to come in contact with the central core's faces in such a manner as between the flat faces of the former and latter, or in the manner of flat face on flat face, respectively. On the other hand, when a curved face makes each of the inner surfaces, the distance between the inner surfaces ranges from short to long. To put it differently, the curved faces create such a problem that interferences have occurred between the parts exhibiting shorter distances that intervene between them. On the contrary, no such a problem arises when flat faces come in contact with each other. As result, it is possible to set the movable magnitude maximally upon moving the paired second divisional molds diametrically in such a direction that they approach one another.

In addition, the die for molding according to the present invention further comprises a third driver. After the second driver has been actuated, the third driver not only moves the paired second divisional molds axially in such a direction that the paired second divisional molds get away from the third divisional molds, but also moves the third divisional molds diametrically toward the present die's center in such a direction that the third divisional molds approach one another, thereby removing or releasing the resultant molded body from the third divisional molds. The third driver actuates the third divisional molds to move diametrically toward the present die's center in such a direction that they approach one another. Thus, from out of a space into which the third divisional molds try to move, the paired second divisional molds have moved already in such a direction that they get away from the third divisional molds. As a result, the third divisional molds can move without ever interfering with the paired second divisional molds, paired first divisional molds and central core. Accordingly, it is possible to provide a longer distance for the third divisional molds to move in such a direction that they approach one another. Consequently, even when the bellows portion has the crests and roots that exhibit greater differences between the heights and the depths, it is easy to remove or release such a bellows portion from the third divisional molds.

Moreover, it is desirable that the third divisional molds can be made so as to come in contact with the central core's faces in such a manner as between the flat faces of the former and latter, or in the manner of flat face on flat face, respectively. As a result, it is possible to avoid the problem associated with the above-described interferences. Therefore, it is possible to set the movable magnitude greater upon moving the third divisional molds diametrically in such a direction that they approach one another. In addition, when the third divisional molds are made so as to come in contact with the paired first divisional molds and paired second divisional molds between the flat faces of the former and latter in the circumferential direction, the third divisional molds neighboring one another oppose to each other by way of the intervening flat faces. Accordingly, the third divisional molds do not interfere with each other at all upon moving in such a direction that they move diametrically. Consequently, it is possible to set the movable magnitude maximally upon moving the third divisional molds diametrically in such a direction that they approach one another.

Note that it is possible to use a combination of sliding cores and inclined pins or inclined cams to make at least one of the first driver, the second driver and the third driver.

After the third driver has been actuated, the molded body is retained on the outer mold with the outer peripheral surface being adhered onto the outer mold's molding face. Accordingly, a fourth removing or releasing step is carried out finally in order to remove or release the resultant molded body from the outer mold. For example, the outer mold can be provided with a plurality of sliding molds that move diametrically in such a direction that they get away from each other. Moreover, the die for molding according to the present invention can further comprise a fourth driver that actuates the outer mold's sliding molds, thereby removing or releasing the molded body from the outer mold's sliding molds. Consequently, the fourth driver, and the outer mold comprising the sliding molds make it possible to readily carryout the fourth removing or releasing step. Similarly to the first, second and third drivers, a combination of sliding cores and inclined pins or inclined cams can be used to make the fourth driver.

The first, second, third and fourth removing or releasing steps can be carried out in this order. However, depending on cases, the third and fourth removing or releasing steps can even be carried out reversibly or in the reversed order. Alternatively, the third and fourth removing or releasing steps can also be carried out simultaneously.

Figure 11:
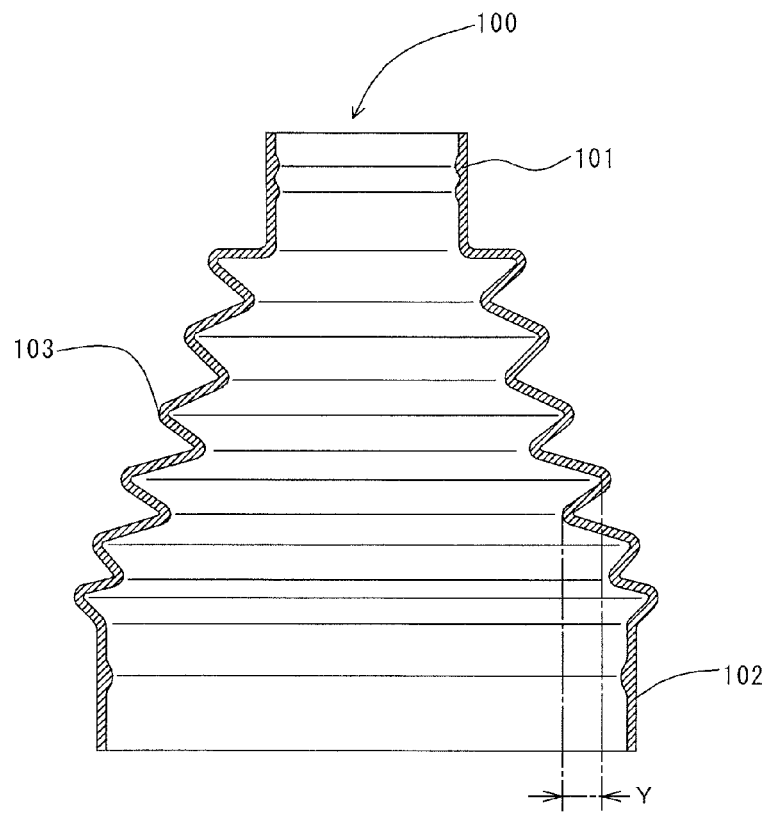
FIG. 11 is across-sectional diagram for illustrating a CVJ boot.
Figure 12:
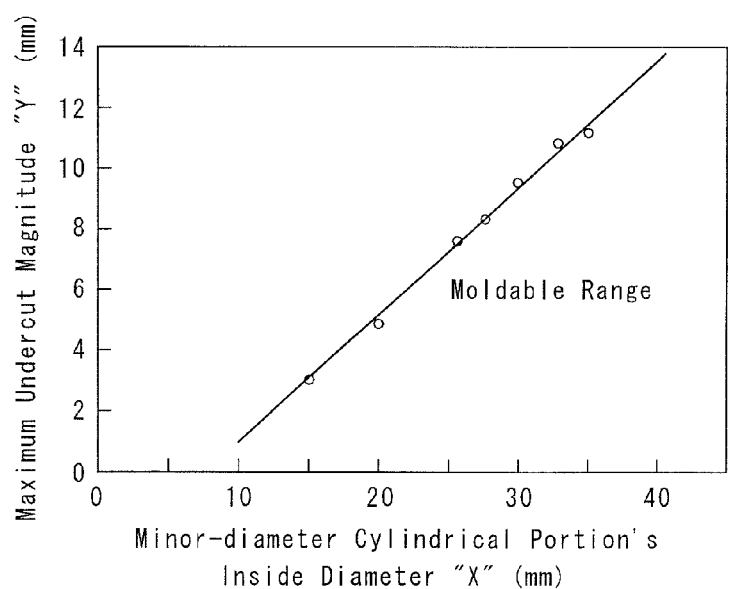
FIG. 12 is a graph for illustrating a dimensional relationship between the minor-diameter cylindrical portion's inside diameter and the bellows portion's maximum undercut magnitude in CVJ boots that are moldable using a die for molding CVJ boot according to the present invention.

Note that the inventors of the present invention studied the configurations of CVJ boot that are moldable by injection molding using the die for molding according to the present invention. As a result, they had ascertained that, in a case where a central core and a pair of first divisional molds as well as a pair of second divisional molds come in contact with each other between the former's flat faces and the latter's flat faces, it is possible to mold CVJ boots by injection molding when both of an inside diameter of the CVJ boots' minor-diameter cylindrical portion and a maximum magnitude of undercut in the CVJ boots' bellows portion are present on the right side with respect to the straight line shown in FIG. 12. Specifically, they had found out that it is possible to mold CVJ boots by injection molding when the CVJ boots have configurations in which an inside diameter "X" of the minor-diameter cylindrical portion and a maximum undercut magnitude "Y" in the bellows portion satisfy Equation (1) below.

$$"Y" \leq 0.4243"X" - 3.3727 \quad \text{Equation (1)}$$

wherein the maximum undercut magnitude "Y" in the bellows portion refers to a maximum value among differences between inner radii of the crests and inner radii of the roots that are adjacent to the crests but are located nearer to the major-diameter cylindrical portion than are the crests, as illustrated in FIG. 11.

Embodiment Mode

Hereinafter, the present invention will be described in detail by reference to one of the specific embodiment modes.

In FIG. 1, there is illustrated an overall cross-sectional diagram of one of the specific embodiments of a die for molding according to the present invention. The present die for molding according to the embodiment is a die for manufacturing CVJ boot by injection molding. Note that, in FIG. 1, the present die is put under the condition of being immediately after injection molding. As illustrated in FIG. 11, a CVJ boot 100 to be manufactured by injection molding is made up of a minor-diameter cylindrical portion 101, a major-diameter cylindrical portion 102, and a bellows portion 103. The major-diameter cylindrical portion 102 has a diameter that is larger than that of the minor-diameter cylindrical portion 101, and is disposed to separate away from the minor-diameter cylindrical portion 101 as well as to be coaxially with the minor-diameter cylindrical portion 101. The bellows portion 103 connects the minor-diameter cylindrical portion 101 with the major-diameter cylindrical portion 102 integrally, and is formed as a circular truncated cone substantially in which crests and roots arise one after another continuously. Note that, in the CVJ boot 100, the minor-diameter cylindrical portion 101 has an inside diameter "X," and the bellows portion 103 exhibits a maximum undercut magnitude "Y"; and the values "X" and "Y" satisfy Equation (1) above.

The present die for molding comprises a stationary die 1, and a movable die 2. The stationary die 1 is made up of an installation plate 10, a first mold 12, a pair of retainers (13, 13). The first mold 12 is fixed to the installation plate 10, and is provided with a cylindrical core 11 for molding the inner peripheral surface of the CVJ boot 100's minor-diameter cylindrical portion 101. The paired retainers (13, 13) are held to the first die 12 integrally. Moreover, the paired retainers (13, 13) are provided with a sliding core 14, respectively. The paired sliding cores (14, 14) have molding faces for molding the outer peripheral surface of the CVJ boot 100's minor-diameter cylindrical portion 101 and bellow portion 103, respectively. In addition, an inclined pin 15 is fixed to the paired sliding cores (14, 14), respectively. The paired inclined pins (15, 15) are assembled slidably inside the first mold 12 and installation plate 10.

Meanwhile, the movable die 2 is made up of an installation plate 21, a first ejector plate 22, a second ejector plate 23, a third ejector plate 24, and a movable core 25. The installation plate 21 is provided central core 20. The first ejector plate 22, second ejector plate 23, third ejector plate 24 and movable core 25 are held between the installation plate 21 and the paired retainers (13, 13). The movable core 25 has a mold face for molding the outer peripheral surface of the CVJ boot 100's major-diameter cylindrical portion 102. The third ejector plate 24, and the movable core 25 are fixed with each other integrally. As a result, a not-shown hydraulic device can actuate not only the third ejector plate 24 and movable core 25 but also the first ejector plate 22 and second ejector plate 23 axially in the direction of getting away from the installation plate 21 as well as in the direction of approaching the installation plate 21.

Figure 2:
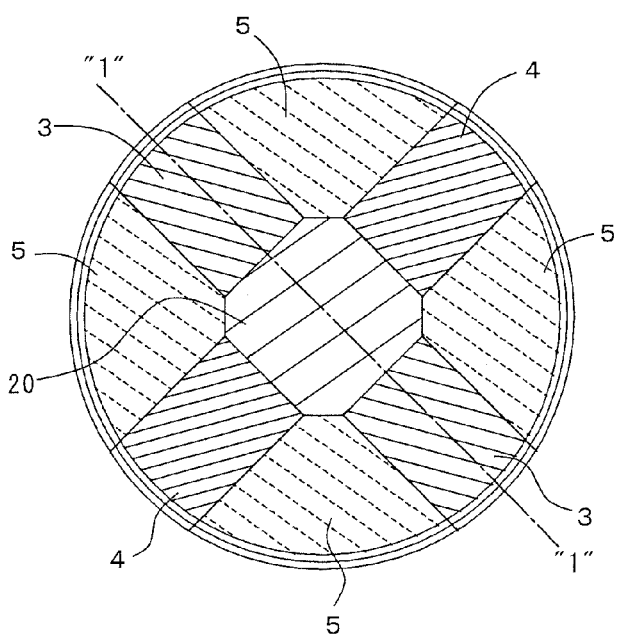
FIG. 2 is a cross-sectional diagram for illustrating a core mold that is used in the present die according to the embodiment, wherein the core mold is placed under the condition of molding a CVJ boot.

As illustrated in FIG. 1, the central core 20 is formed as a truncated pyramid, which has a variable diameter that becomes smaller as it comes from the trailing end to the leading end, in the vertical cross section. Moreover, the central core 20 is formed as an octagonal shape substantially in the horizontal cross section, as shown in FIG. 2. Around the central core 20, a pair of first divisional molds (3, 3), a pair of second divisional molds (4, 4), and two pairs of third divisional molds (5,5), (5,5) are laid out. The paired first divisional molds (3, 3) are disposed to face one another about the central core 20 serving as the center. The paired second divisional molds (4, 4) are disposed to face one another about the central core 20, and to cross the disposition direction of the paired first divisional molds (3, 3) orthogonally. The two paired third divisional molds (5, 5), (5, 5) are disposed so as to fill the openings between one of the paired first divisional molds (3, 3) and one of the paired second divisional molds (4, 4), respectively. The paired first divisional molds (3, 3), the paired second divisional molds (4, 4), and the two paired third divisional molds (5, 5), (5, 5) are provided with molding faces for molding the inner peripheral surfaces of the CVJ boot 100's major-diameter cylindrical portion 102 and bellows portion 103, respectively. Moreover, the paired first divisional molds (3, 3) and paired second divisional molds (4, 4), and the two paired third divisional molds (5, 5), (5, 5) abut on the central core 20 via the contact between the former's flat faces and the latter's flat faces, respectively. In addition, one of the paired first divisional molds (3,3) and one of the two paired third divisional molds (5, 5), (5, 5) come in contact with each other via the contact between the former's flat faces and the latter's flat faces. Likewise, one of the paired second divisional molds (4,4) and one of the two paired third divisional molds (5, 5), (5, 5) come in contact with each other via the contact between the former's flat faces and the latter's flat faces.

As illustrated in FIG. 1, the paired first divisional molds (3, 3) are made up of a first core 30, and a first leg 31, respectively. The first core 30 is disposed along the surface of the central core 20, and is provided with molding faces for molding the inner peripheral surfaces of the CVJ boot 100's major-diameter cylindrical portion 102 and bellows portion 103. Moreover, the first core 30 is provided with an inclined flat-face shape, which conforms to the surface of the central core 20, on the inner surface that is opposite to the molding faces. In addition, the first leg 31 extends outward from the trailing end of the first core 30, and is then retained slidably to the first ejector plate 22. Moreover, the first leg 31 engages with a first inclined cam 32 one of whose opposite ends is fixed to the installation plate 21.

Figure 5:
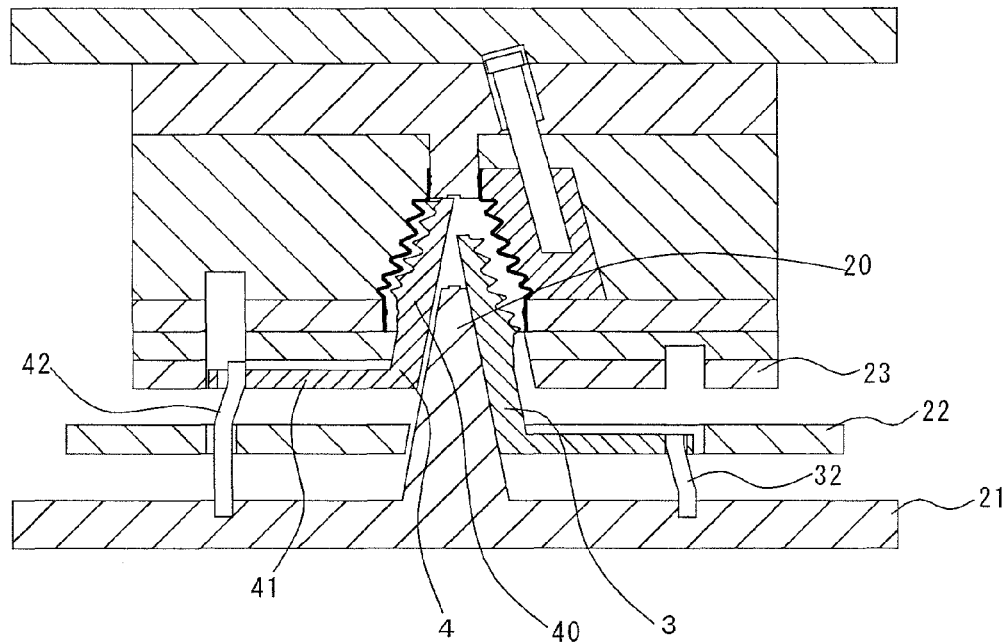
FIG. 5 is a cross-sectional diagram that is taken along the imaginary chain line "5"-"5" in FIG. 6, wherein the present die according to the embodiment is placed under the condition of carrying out a second die-opening step.

As illustrated in FIG. 5, the paired second divisional molds (4, 4) are made up of a second core 40, and a second leg 41, respectively. The second core 40 is disposed along the surface of the central core 20, and is provided with molding faces for molding the inner peripheral surfaces of the CVJ boot 100's major-diameter cylindrical portion 102 and bellows portion 103. Moreover, the second core 40 is provided with an inclined flat-face shape, which conforms to the surface of the central core 20, on the inner surface that is opposite to the molding faces. In addition, the second leg 41 extends outward from the trailing end of the second core 40, and is then retained slidably to the second ejector plate 23. Moreover, the second leg 41 engages with a second inclined cam 42 one of whose opposite ends is fixed to the installation plate 21.

Figure 7:
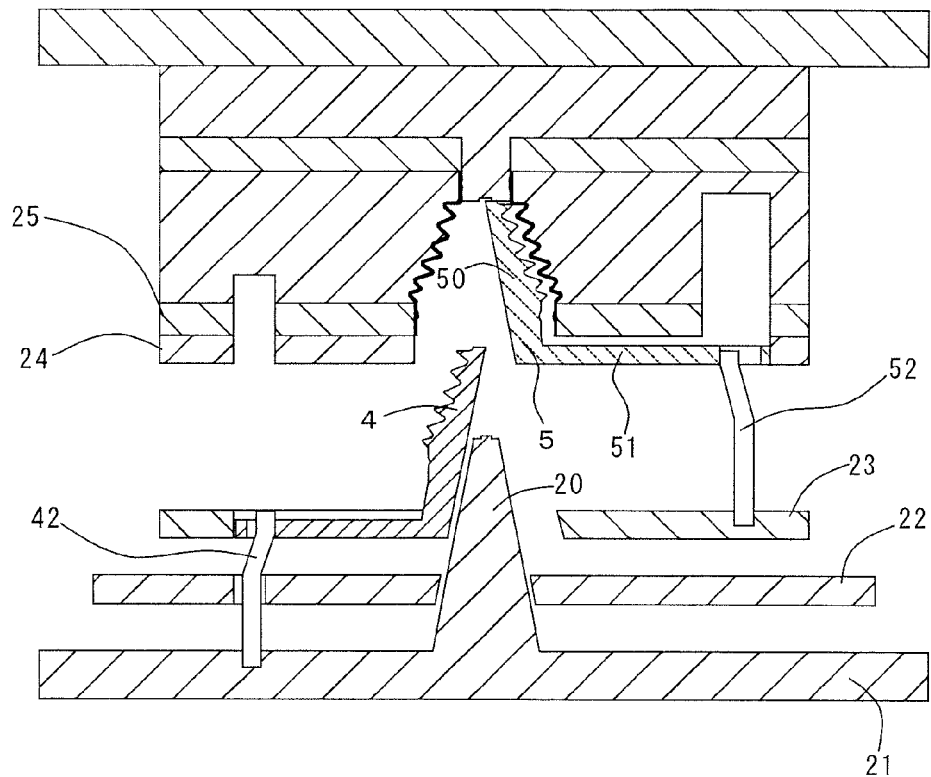
FIG. 7 is a cross-sectional diagram that is taken along the imaginary chain line "7"-"7" in FIG. 8, wherein the present die according to the embodiment is placed under the condition of carrying out a third die-opening step.

As illustrated in FIG. 7, the two paired third divisional molds (5, 5), (5, 5) are made up of a third core 50, and a third leg 51, respectively. The third core 50 is disposed along the surface of the central core 20, and is provided with molding faces for molding the inner peripheral surfaces of the CVJ boot 100's major-diameter cylindrical portion 102 and bellows portion 103. Moreover, the third core 50 is provided with an inclined flat-face shape, which conforms to the surface of the central core 20, on the inner surface that is opposite to the molding faces. In addition, the third leg 51 extends outward from the trailing end of the third core 50, and is then retained slidably to the third ejector plate 24. Moreover, the third leg 51 engages with a third inclined cam 52 one of whose opposite ends is fixed to the second ejector plate 23.

Note that the connecting rods for connecting or fixing the respective constituent elements, or the connecting pins for supporting the sliding cores slidably, are not shown in the drawings in order to simply the illustrations on the present die for molding according to the specific embodiment.

Hereinafter, mechanisms for operating the present die for molding according to the specific embodiment being constructed as above will be described in detail.

Molding Step

First of all, the stationary die 1, and the movable die 2 are clamped or closed at the time of injection molding, as shown in FIG. 1. Then, as illustrated in FIG. 2, the paired first divisional molds (3, 3), the paired second divisional molds (4, 4), and the two paired third divisional molds (5, 5), (5, 5) abut on and around the central core 20 so that their respective flat faces come in contact with each other. Moreover, the sliding cores 14 surround around the outer periphery of the paired first divisional molds (3, 3), paired second divisional molds (4, 4) and two paired third divisional molds (5, 5), (5,5) with an interval being provided therebetween by the CVJ boot 100's wall thickness. In other words, a cavity is formed between the outer peripheral surfaces of the paired first divisional molds (3, 3), paired second divisional molds (4,4), two paired third divisional molds (5, 5), (5, 5) and cylindrical core 11 and the inner peripheral surfaces of the paired sliding cores (14, 14). Thus, a molding material composed of thermoplastic elastomer is injected into the resulting cavity by the not-shown runner and gate with which the stationary die 1 is provided.

First Die-Opening Step

Figure 3:
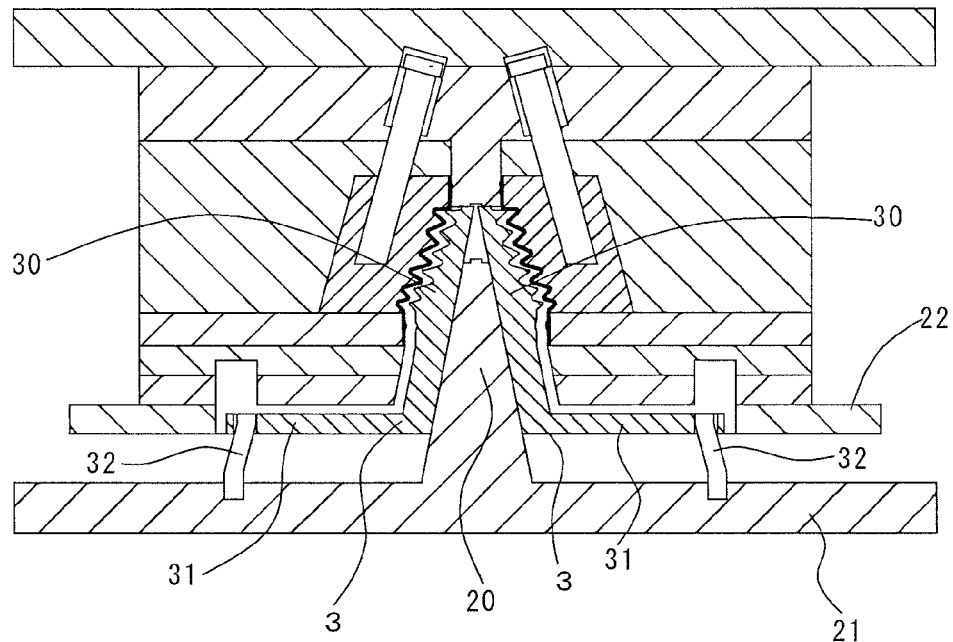
FIG. 3 is a cross-sectional diagram that is taken along the imaginary chain line "3"-"3" in FIG. 4, wherein the present die according to the embodiment is placed under the condition of carrying out a first die-opening step.
Figure 4:
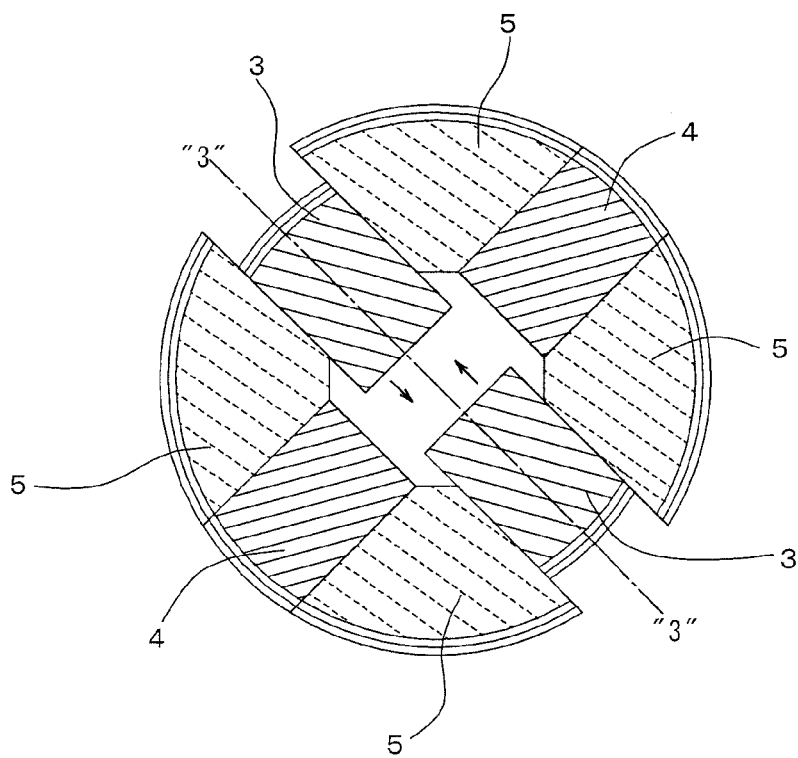
FIG. 4 is a cross-sectional diagram for illustrating the core mold that is placed under the condition of carrying out a first die-opening step.

After completing the injection molding, a not-shown hydraulic cylinder device first moves the installation plate 21 in the direction of getting away from the first ejector plate 22. Then, the central core 20 moves downward in FIG. 1, thereby engaging the first inclined cams 32 with the first legs 31 as shown in FIG. 3. The thus engaged first inclined cams 32 and first legs 31 slide the paired first divisional molds (3, 3) in the direction of approaching the central core 20. Moreover, each of the paired first divisional molds (3, 3) moves inward diametrically, as shown in FIG. 4. As a result, first sections of the resulting CVJ boot 100's inner peripheral surface are released from the molding faces of the paired first cores (30, 30), as shown in FIG. 3.

Second Die-Opening Step

Next, the not-shown hydraulic device presses the installation plate 21 and first ejector plate 22 to actuate them downward in FIG. 3. Accordingly, the central core 20 and paired first divisional molds (3, 3) move downward in FIG. 3. Consequently, as illustrated in FIG. 5, the paired second divisional molds (4, 4) slide in the direction of approaching the central core 20, because the second inclined cams 42 engage with the second legs 41. As a result, other sections (or second sections) of the resulting CVJ boot 100's inner peripheral surface are released from the molding faces of the paired second cores (40, 40) as shown in FIG. 5, because each of the paired second divisional molds (4, 4) moves inward diametrically, as shown in FIG. 6.

Figure 6:
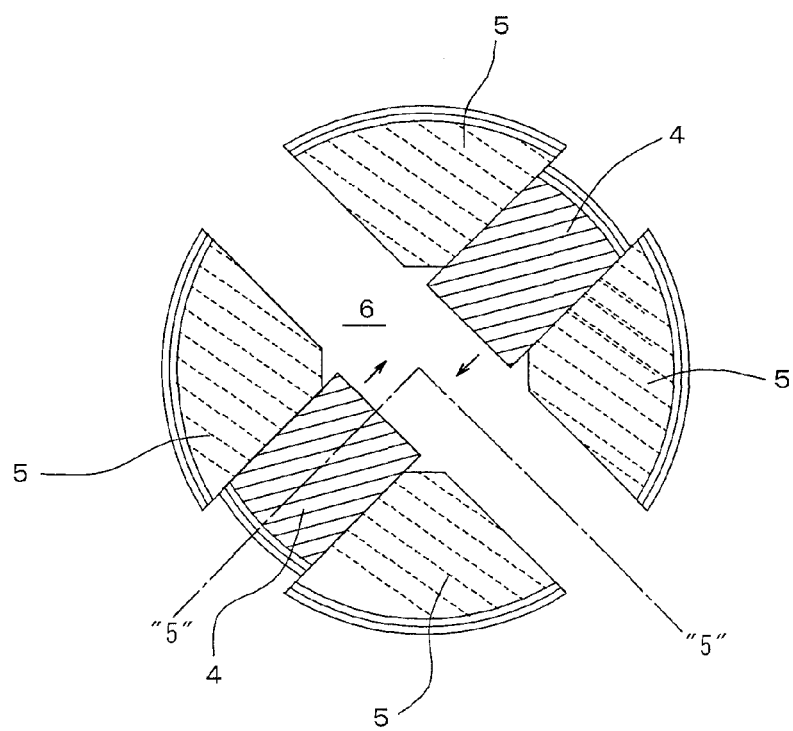
FIG. 6 is a cross-sectional diagram for illustrating the core mold that is placed under the condition of carrying out a second die-opening step.

To put it differently, the paired second divisional molds (4,4) move in the direction of approaching each other to go into a space 6 shown in FIG. 6. The space 6 is formed with a sufficient interval because the paired first divisional molds (3, 3) have already moved downward as shown in FIG. 5. Moreover, the paired second divisional molds (4, 4), and the two paired third divisional molds (5, 5), (5, 5) come in contact with each other via their flat surfaces that are parallel to the moving direction of the paired second divisional molds (4, 4). Accordingly, it is possible to provide a greater magnitude for moving the paired second divisional molds (4, 4). Consequently, the resulting CVJ boot 100's bellows portion 103 does not make any undercut at all even when the bellows portion 103 exhibits larger differences between the crests' heights and the roots' depths. Therefore, it is possible to remove or release the resultant CVJ boot 100 from the paired second divisional molds (4, 4) with ease.

Third Die-Opening Step

Figure 8:
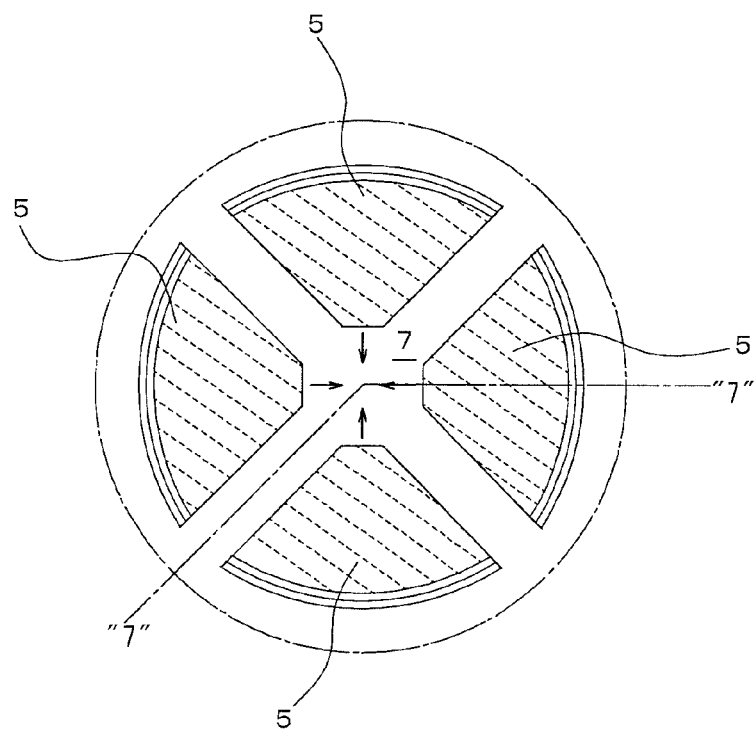
FIG. 8 is a cross-sectional diagram for illustrating the core mold that is placed under the condition of carrying out a third die-opening step.

Subsequently, the not-shown hydraulic device moves the installation plate 21, first ejector plate 22 and second ejector plate 23 downward in FIG. 5 in order to actuate the central core 20, paired first divisional molds (3, 3) and paired second divisional molds (4, 4) downward in the drawing. Then, as illustrated in FIG. 7, the third inclined cams 52 engage with the third legs 51. The thus engaged third inclined cams 52 and third legs 51 slide the two paired third divisional molds (5, 5), (5, 5) in the direction of approaching the central core 20. Moreover, each of the two paired third divisional molds (5, 5), (5, 5) moves inward diametrically, as shown in FIG. 8. As a result, still another sections (or third sections) of the resulting CVJ boot 100's inner peripheral surface are released from the molding faces of the two paired third cores (50, 50), (50, 50).

On this occasion, as illustrated in FIG. 8, a wide space 7 arises between the two paired third divisional molds (5, 5), (5, 5), because the central core 20, paired first divisional molds (3, 3) and paired second divisional molds (4, 4) have already moved downward in FIG. 7. Moreover, the neighboring two of the two paired third divisional molds (5, 5), (5, 5) face with each other so as to make their flat faces parallel to one another. Accordingly, it is possible to move the two paired third divisional molds (5, 5), (5, 5) diametrically over a longer distance. Consequently, the resulting CVJ boot 100's bellows portion 103 does not make any undercut at all even when the bellows portion 103 exhibits larger differences between the crests' heights and the roots' depths. Therefore, it is possible to remove or release the resultant CVJ boot 100 from the two paired third divisional molds (5, 5), (5, 5) with ease.

Fourth Die-Opening Step

Figure 9:
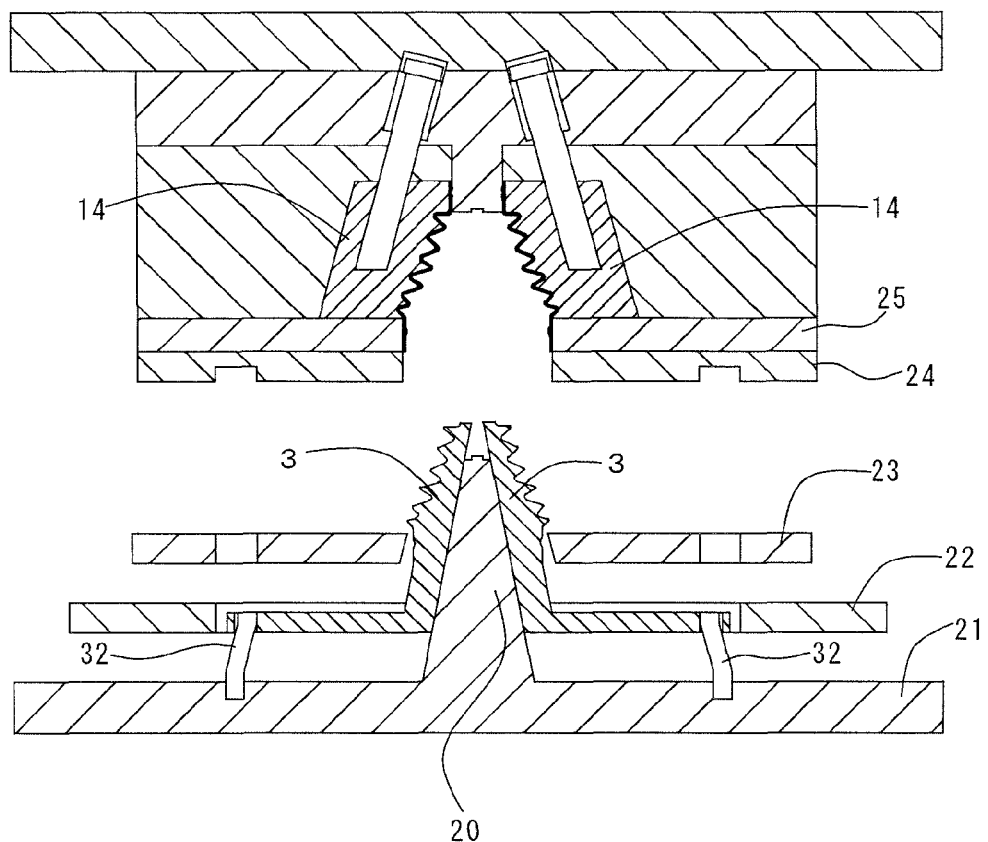
FIG. 9 is a cross-sectional diagram that corresponds to FIG. 1 being taken along the imaginary chain line "1"-"1" in FIG. 2, wherein the present die according to the embodiment is placed under the condition after completing a third die-opening step.
Figure 10:
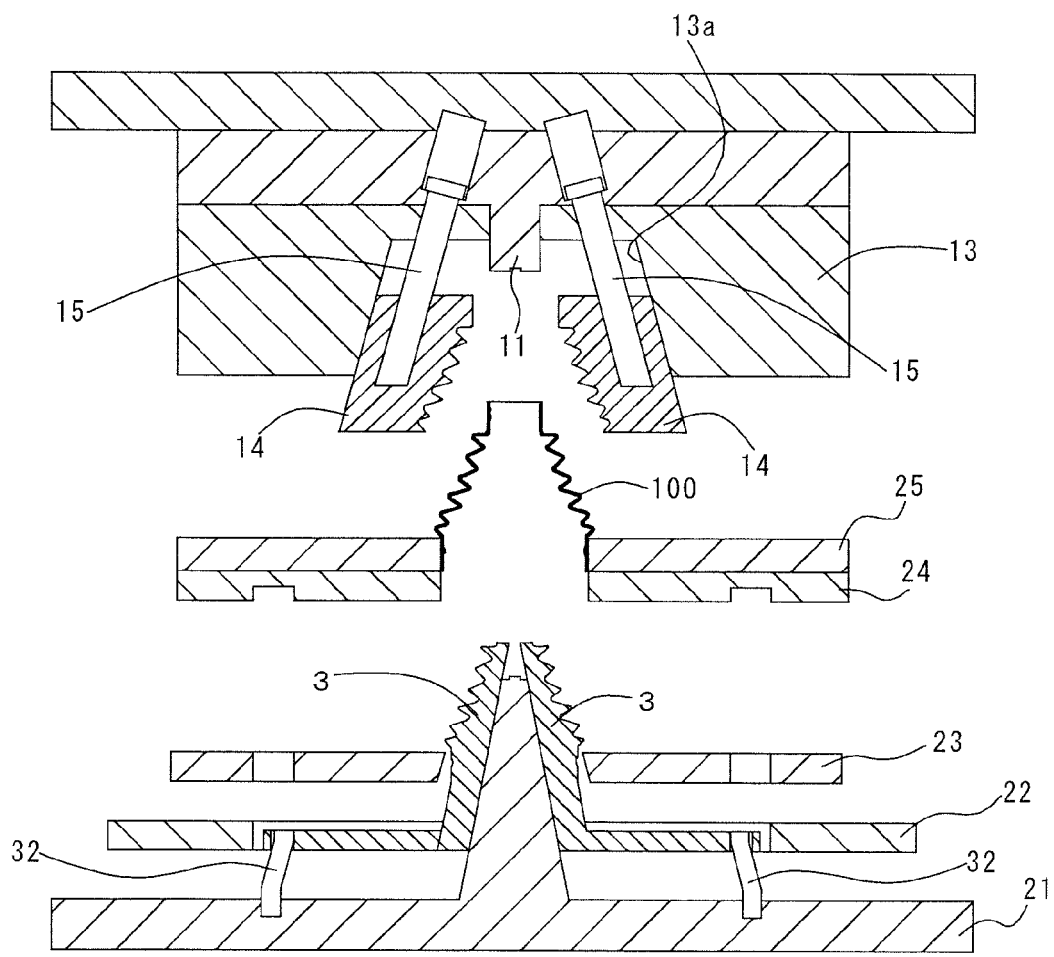
FIG. 10 is across-sectional diagram that corresponds to FIG. 1 being taken along the imaginary chain line "1"-"1" in FIG. 2, wherein the present die according to the embodiment is placed under the condition of carrying out a fourth die-opening step.

Under the above-described circumstances, the resulting CVJ boot 100 is left being adhered onto the stationary die 1, not onto the paired first divisional molds (3,3), paired second divisional molds (4, 4) and two paired third divisional molds (5, 5), (5, 5) (i.e., the movable die 2), as also shown in FIG. 9. Accordingly, the not-shown hydraulic device moves the installation plate 21, first ejector plate 22, second ejector plate 23, third ejector plate 24 and movable core 25 downward in FIG. 9. Consequently, as illustrated in FIG. 10, the paired sliding cores (14, 14) and paired inclined pins (15, 15) move downward of themselves because of their own weights. Note that the paired sliding cores (14, 14) move downward in the drawing while being guided by an inclined face 13a with which the retainer 13 is provided. Moreover, the paired inclined pins (15, 15) move downward in the drawing while being guided by a pair of sliding holes with which the retainer 13 is provided. Thus, the outer peripheral surface of the resultant CVJ boot 100's bellows portion 103 is removed or released from the paired sliding cores (14, 14), and the inner peripheral surface of the minor-diameter cylindrical portion 101 is removed or released from the cylindrical core 11. As a result, the molded CVJ boot 100 remains being seated on the movable core 25. Finally, a not-shown ejector pin sticks out from out of the movable die 2's movable core 25 in order to remove or release the completed CVJ boot 100 from the movable die 2.

Specifically, it follows that the present die for molding according to the specific embodiment makes it possible to readily remove or release the resulting CVJ boots from the present die's constituent molds, because the CVJ boots do not make any undercut at all even when the bellows portion 103 exhibits larger differences between the crests' heights and the roots' depths. Therefore, the present die enables manufactures to manufacture CVJ boots by injection molding. That is, the present die enables manufacturers to manufacture high-quality CVJ boots stably, because the manufacturers can control the wall thickness of CVJ boots' bellows portion 103 highly accurately.

Having now fully described the present invention, it will be apparent to one of ordinary skill in the art that many changes and modifications can be made thereto without departing from the spirit or scope of the present invention as set forth herein including the appended claims.

What is claimed is:

1. A die for molding, the die being used in order to manufacture boot for constant-velocity universal joint (hereinafter being abbreviated to as"CVJ boot") by injection molding, the CVJ boot comprising: a minor-diameter cylindrical portion having a given diameter; a major-diameter cylindrical portion having a diameter that is larger than the diameter of the minor-diameter cylindrical portion, and being disposed to separate away from the minor-diameter cylindrical portion as well as to be coaxially with the minor-diameter cylindrical portion; and a bellows portion having a configuration of circular truncated cone substantially, and connecting the minor-diameter cylindrical portion with the major-diameter cylindrical portion integrally, and the die comprising:
    an outer mold having a mold face for molding an outer peripheral surface of the CVJ boot; and
    a core mold having a mold face for molding an inner peripheral surface of the CVJ boot;
    the core mold comprising:
        a central core having a configuration whose diameter tapers from wide to narrow in the direction away from a trailing end to a leading end; and
        a plurality of divisional molds being disposed radially about the central core, and having a mold face for molding an inner peripheral surface of the CVJ boot on an outer peripheral surface thereof, respectively;
    the divisional molds comprising:
        a pair of first divisional molds being disposed to face one another about the central core;
        a pair of second divisional molds being disposed to face one another about the central core in an orthogonal direction with respect a disposition direction of the paired first divisional molds; and a plurality of third divisional molds being disposed between one of the paired first divisional molds and one of the paired second divisional molds, respectively; and the die further comprising:
a first driver for retracting the central core in order to move the paired first divisional molds diametrically toward a center of the die in such a direction that the paired first divisional molds approach one another, thereby releasing a molded body from the paired first divisional molds;

a second driver for not only moving the paired first divisional molds axially in such a direction that the paired first divisional molds get away from the paired second divisional molds but also moving the paired second divisional molds diametrically toward the center of the die in such a direction that the paired second divisional molds approach one another, after actuating the first driver, thereby releasing the molded body from the paired second divisional molds; and a third driver for not only moving the paired second divisional molds axially in such a direction that the paired second divisional molds get away from the third divisional molds but also moving the third divisional molds diametrically toward the center of the die in such a direction that the third divisional molds approach one another, after actuating the second driver, thereby releasing the molded body from the third divisional molds.

2. The die according to claim 1, wherein:
the paired first divisional molds, the paired second divisional molds, and the third divisional molds have a flat face on a side surface thereof, respectively; and
the flat faces come in contact with each other in a circumferential direction of the die when molding the molded body.

3. The die according to claim 1, wherein:
the central core has a polygonal configuration in cross section;
the paired first divisional molds, the paired second divisional molds, and the third divisional molds have a flat face on an inner peripheral surface thereof, respectively; and
each of the flat faces comes in contact with a surface of the central core when molding the molded body.

4. The die according to claim 1 further comprising an inclined cam and a sliding core that engage with each other, thereby actuating at least one of the first driver, the second driver and the third driver.

5. The die according to claim 1, wherein the outer mold comprises a plurality of sliding cores that move diametrically in such a direction that they get away from each other, thereby releasing the molded body from the outer mold.

6. The die according to claim 1, wherein the CVJ boot comprises:
the minor-diameter cylindrical portion exhibiting an inside diameter "X";
the bellows portion exhibiting a maximum undercut magnitude "Y";
the values "X" and "Y" satisfy Equation (1) below:

"Y"≤0.4243"X"−3.3727     Equation (1); and the core mold comprises:
the paired first divisional molds, and the paired second divisional molds having a flat face, respectively;
the central core having a flat face; and
the flat faces coming in contact with each other.

7. The die according to claim 1, wherein the paired first divisional molds, the paired second divisional molds, and the third divisional molds taper linearly from wide to narrow axially in the direction away from a trailing end to a leading end on an inner peripheral surface, respectively, thereby not only making the paired first divisional molds, the paired second divisional molds and the third divisional molds slidable against each other axially but also making them slidable against an outer peripheral the central core axially.

8. The die according to claim 1, wherein:
one of the third divisional molds abuts on one of the paired first divisional molds and one of the paired second divisional mold, thereby being held between them; and
another one of the third divisional molds abuts on another one of the paired first divisional molds and another one of the paired second divisional mold, thereby being held between them.

9. The die according to claim 1, wherein a first member of the paired first divisional molds, a first member of the third divisional molds at least, a first member of the paired second divisional molds, a second member of the paired first divisional molds, a second member of the third divisional molds at least, and a second member of the paired second divisional molds are disposed in this order so as to abut on each other around the central core.

10. The die according to claim 1, wherein:
the central core is free from any curved face on an outer peripheral surface thereof; and
the paired first divisional molds, the paired second divisional molds, and the third divisional molds are free from any curved face on an inner peripheral surface thereof, respectively.

11. The die according to claim 1, wherein the central core has a truncated pyramidal cross section axially, and a polygonal cross section diametrically.

12. A process for molding CVJ boot, the CVJ boot comprising:
a minor-diameter cylindrical portion having a given diameter;
a major-diameter cylindrical portion having a diameter that is larger than the diameter of the minor-diameter cylindrical portion, and being disposed to separate away from the minor-diameter cylindrical portion as well as to be coaxially with the minor-diameter cylindrical portion; and
a bellows portion having a configuration of circular truncated cone substantially, and connecting the minor-diameter cylindrical portion with the major-diameter cylindrical portion integrally;
when manufacturing the CVJ boot by injection molding, the process using a die for molding, the die comprising:
an outer mold having a mold face for molding an outer peripheral surface of the CVJ boot; and
a core mold having a mold face for molding an inner peripheral surface of the CVJ boot;
the core mold comprising:
a central core having a configuration whose diameter tapers from wide to narrow in the direction away from a trailing end to a leading end; and
a plurality of divisional molds being disposed radially about the central core, and having a mold face for molding an inner peripheral surface of the CVJ boot on an outer peripheral surface thereof, respectively;
the divisional molds comprising:
a pair of first divisional molds being disposed to face one another about the central core;

a pair of second divisional molds being disposed to face one another about the central core in an orthogonal direction with respect a disposition direction of the paired first divisional molds; and a plurality of third divisional molds being disposed between one of the paired first divisional molds and one of the paired second divisional molds, respectively; and the process comprising the steps of:

molding a molded body by injecting a molding material into a cavity being formed between the core mold and the outer mold;

releasing the molded body firstly from the paired first divisional molds by not only retracting the central core but also moving the paired first divisional molds diametrically toward a center of the die in such a direction that the paired first divisional molds approach one another;

releasing the molded body secondly from the paired second divisional molds by not only moving the paired first divisional molds axially in such a direction that the paired first divisional molds get away from the paired second divisional molds but also moving the paired second divisional molds diametrically toward the center of the die in such a direction that the paired second divisional molds approach one another;

releasing the molded body thirdly from the third divisional molds by not only moving the paired second divisional molds axially in such a direction that the paired second divisional molds get away from the third divisional molds but also moving the third divisional molds diametrically toward the center of the die in such a direction that the third divisional molds approach one another; and releasing the molded body fourthly from the outer mold.

* * * * *